United States Patent Office 3,421,333
Patented Jan. 14, 1969

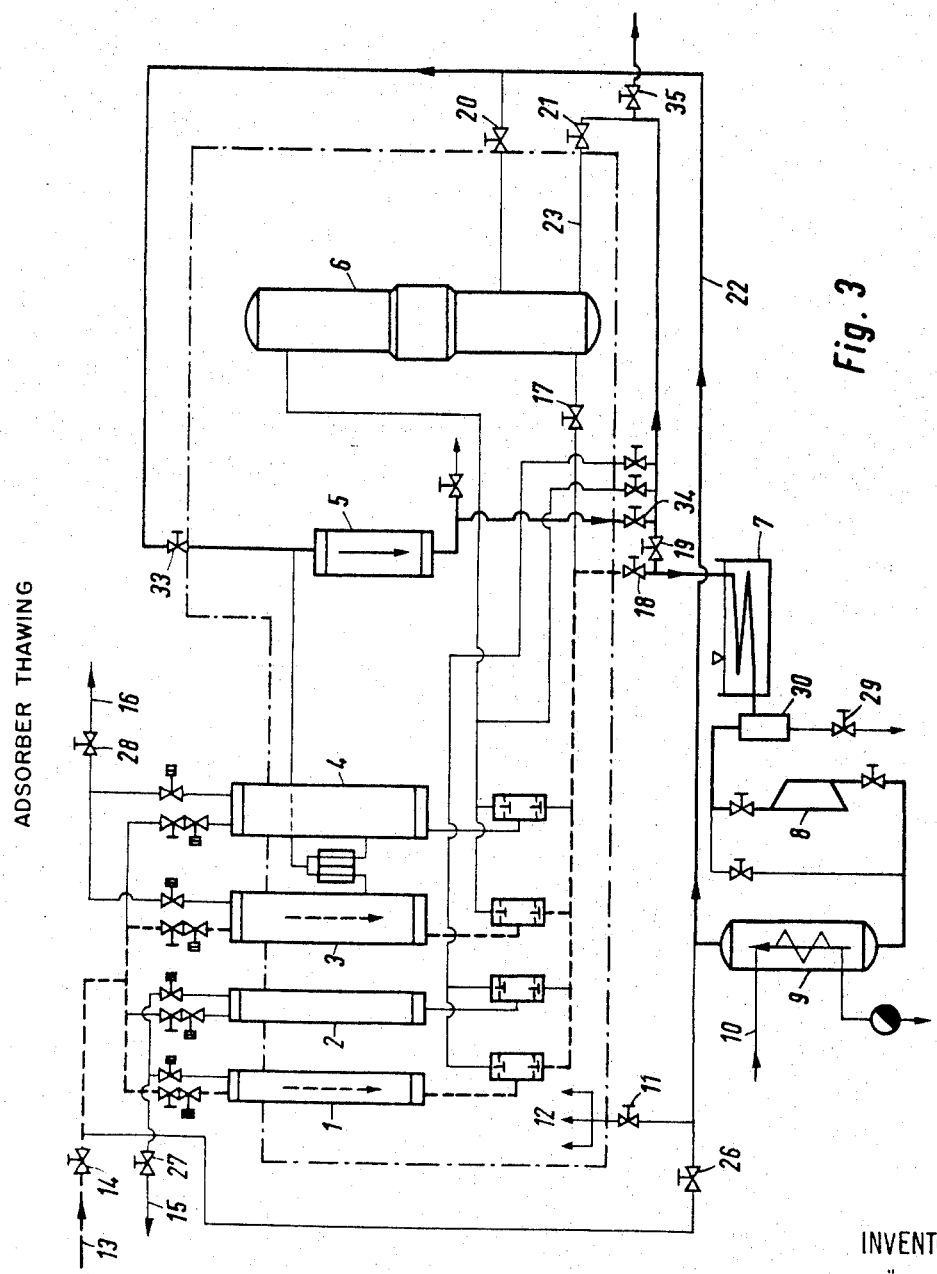

3,421,333
THAWING TECHNIQUE FOR A SINGLE AIR SEPARATION PLANT
Georg Plötz, Munich, Andreas Mayer, Pullach, Isartal, and Adolf Lewandowski, Grosshesselohe, Germany, assignors to Linde Aktiengesellschaft, Wiesbaden, Germany
Filed Aug. 20, 1965, Ser. No. 481,201
Claims priority, application Germany, Aug. 28, 1964, G 41,399
U.S. Cl. 62—13　　　　2 Claims
Int. Cl. F25j 3/04

ABSTRACT OF THE DISCLOSURE

Air is cleaned of impurities and separated in a single air separation plant. Apparatus-to-be-thawed in the single air separation plant is thawed by employing the clean gas as the thawing gas for the apparatus in the single plant. The cleaned gas, in a substantially closed cycle is warmed in indirect heat exchange with water at ambient temperature, passed through a blower and is then further warmed by indirect heat exchange with steam. The clean gas is repeatedly recycled in direct contact with the interior of the apparatus-to-be-thawed while a portion of warmed thawing gas is passed directly into the rock wool surrounding the apparatus-to-be-thawed.

---

This invention relates to a method and an apparatus for thawing low temperature gas separation systems, particularly air separating plants.

Owing to operational problems, it is sometimes necessary to heat and/or derime low temperature gas separation plants or parts thereof, for example, in order to free them from a build-up of deleterious deposits, or to carry out repairs. Normally the gas employed for deriming is warmer than the part of the apparatus ot be derimed, and must not contain any impurities which would condense or congeal on the part of the apparatus during the deriming process. When using air as warm-up gas, its humidity in particular must be so low that the dew point is not reached at any place of the apparatus.

To provide such low humidity gas, a conventional method in low temperature gas separation plants is to dry the scavenging gas by means of adsorbers. For this purpose, generally at least two switchable adsorbers or the like must be employed so that the saturated adsorbent (e.g. silica gel) can be regenerated without interrupting the deriming operation. These water adsorbers are only used for deriming, and as such, they represent a relatively high investment cost for the short time they are used.

An object of this invention, therefore, is to provide an improved thawing process and apparatus therefor which eliminates the need for switchable adsorbers for removing humidity from scavenging gas.

Upon further study of the specification and claims other objects and advantages of the present invention will become apparent.

To attain the objects of this invention, there is provided a system wherein gas previously cleaned in a switchable heat exchanger (regenerator or reversible heat exchanger) is heated and then passed into contact with the part of the apparatus to be thawed.

Figure 1:
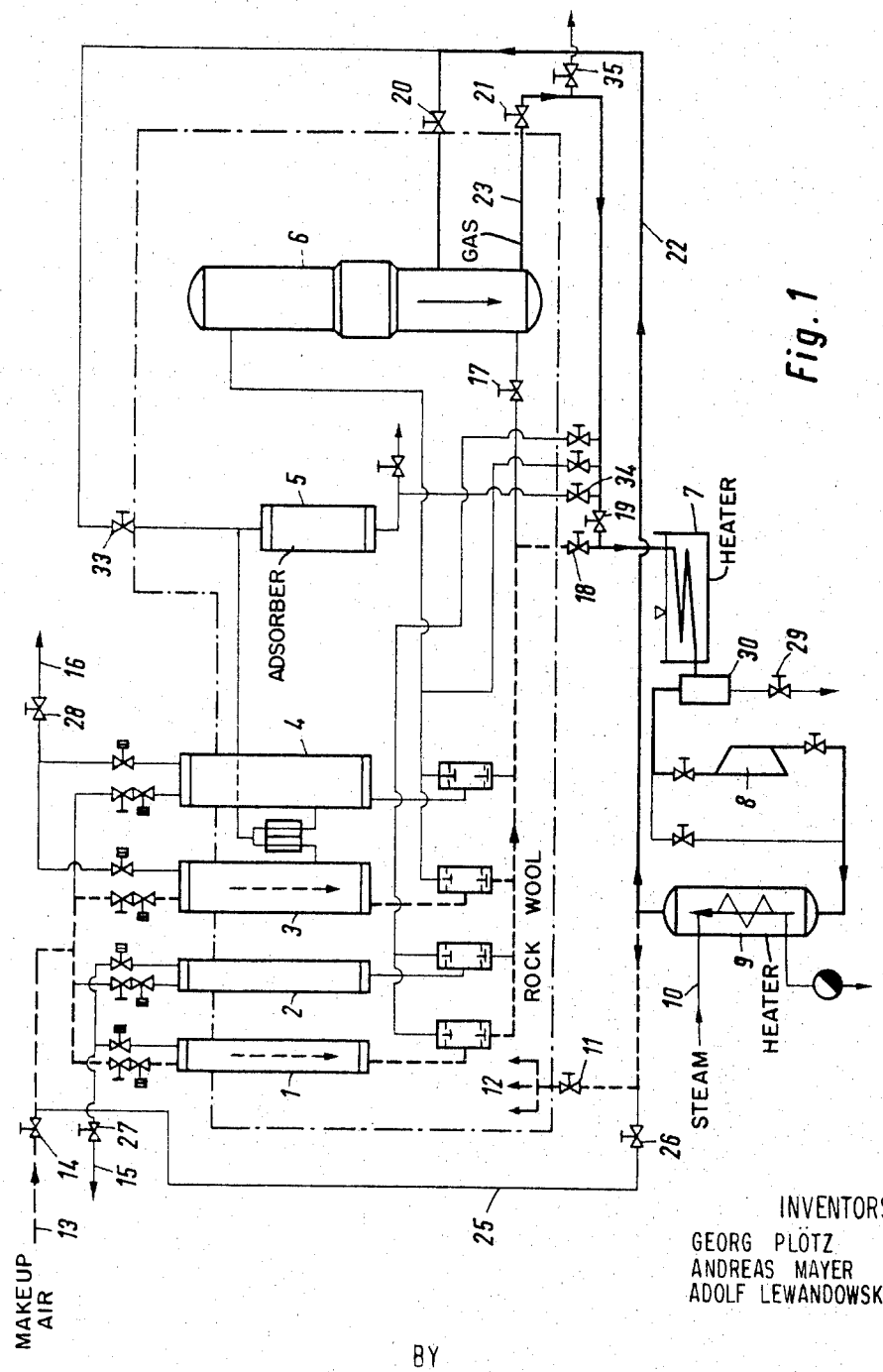
Figure 2:
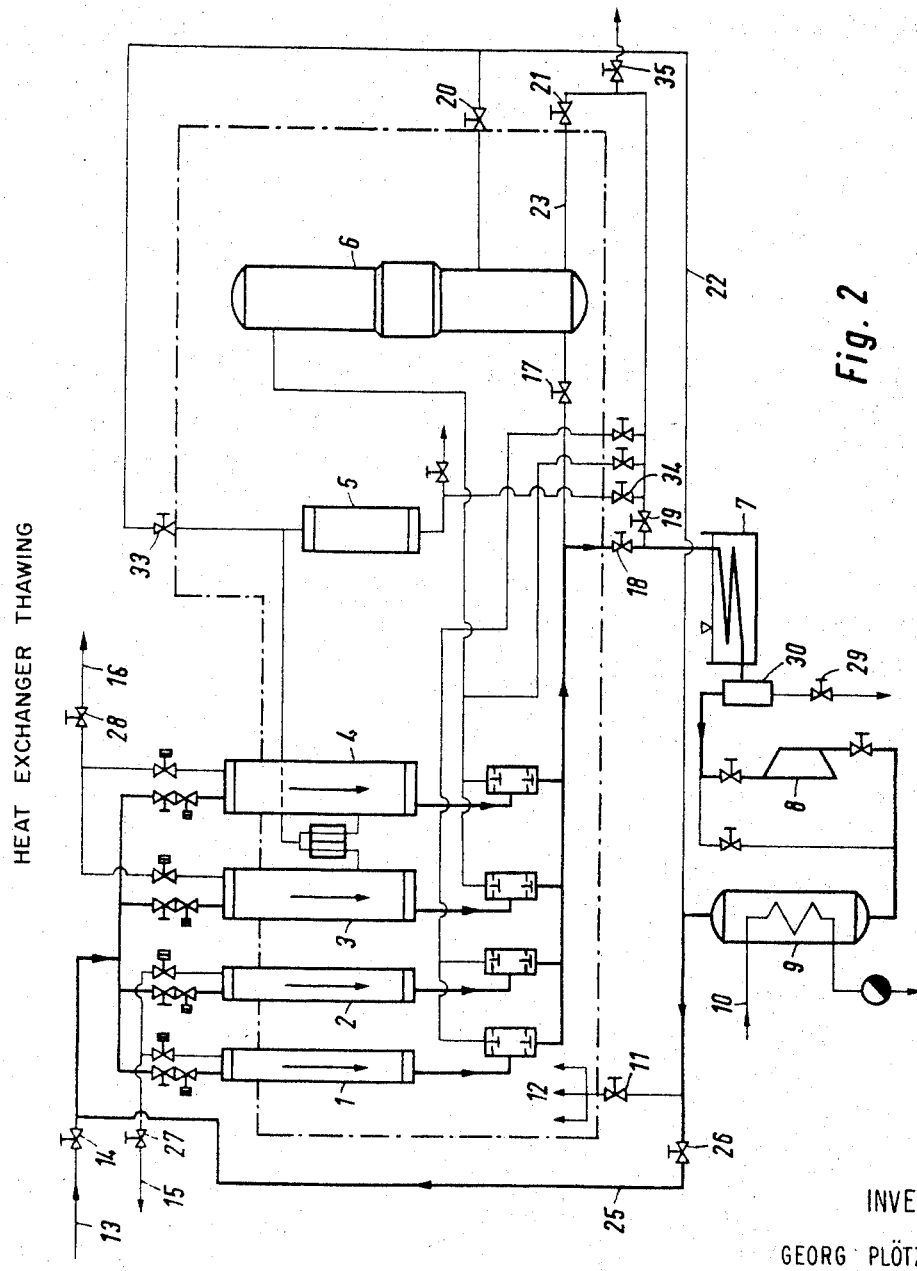

Referring now to the attached drawings, they represent preferred specific embodiments of the invention and are described briefly as follows:

FIGURES 1, 2, 3 are schematic flowsheets, FIGURE 1 illustrating the invention as applied to heating the rectification column, FIGURE 2 as applied to deriming regenerators, and FIGURE 3 as applied to heating and regenerating an adsorber.

In accordance with the invention, the gas present during normal operation in the plant is used as warm-up gas during the thawing process to which the plant is subjected. For this purpose, it is merely necessary to conduct the gas stream, by a suitable setting of the valves, in such a manner that it flows in a cycle through a warm-up device and through the apparatus to be warmed. As this gas, after having entered the plant, has been passed through the main heat exchangers, such as regenerators or reversing exchangers and was therein freed from impurities, particularly moisture, no further gas-cleaning measures are required for its use as a thawing medium.

In many cases, it is not necessary to thaw the entire low temperature plant. Partial thawing can be conducted by the method of this invention in a particularly advantageous manner by establishing a cycle, by means of suitable setting of the valves, between only the part of the apparatus to be thawed and the warm-up device.

Essentially, two major systems are involved in the thawing process, (1) the separation apparatus proper, i.e., the rectification column, and (2) the main heat exchanger, i.e. the regenerators and/or reversing exchangers. When thawing the entire plant, it is preferable to warm these two systems separately and sequentially with the separation apparatus preferably being first.

The gas flowing in the warm-up cycle is preferably circulated by means of a blower and is heated in at least one warm-up device. This warming-up process can be conducted in several stages. It is particularly suitable to connect two heat exchangers in series, the gas being warmed up to ca. 5–15° C. in a first heat exchanger by water of ambient temperature, i.e. 40 to 15° C., and in a second heat exchanger by steam. In any event it is preferred that the hot gas has a temperature of at least 70° C., for rectification and heat exchange-apparatus and at least 150° C., for adsorbers. Towards the end of the warming up-process liquid water can occur which is to be separated before compressing the circulating gas.

The gas is circulated in the cycle until the desired temperature of the apparatus, preferably being above the outside temperature is reached. The cycle gas can then be removed to the outside and the plant can be purged with a scavenging gas in a conventional manner, if desired, for further cleaning. In order to accelerate the warming-up process, a small portion of the gas circulated in the cycle can be blown into the rock wool insulation or the like surrounding the apparatus in the cold box. This loss of gas can be replaced by fresh gas charged through the main heat exchangers. When using regenerators in particular, wherein a large amount of refrigeration energy is stored, the temperature rises only very slowly, even when feeding rather large amounts of gas, so that rather large amounts of gas are still sufficiently cleansed in order to be used in the warming-up cycle. In this manner, it is also possible to compensate for gas losses in the warming-up cycle due to leaks in the apparatus. It is not at all harmful to replace such smaller gas losses directly by outside air, as long as the moisture in the warming-up gas remains within such limits that no condensates are precipitated.

This invention will now be explained in greater detail with reference to the preferred specific embodiments illustrated in FIGURES 1 to 3. In these figures, the same air separation plant is illustrated in all systems, the path of the warming-up stream for thawing the specific apparatus being identified by bold lines provided with arrows. Identical or corresponding parts are designated by the same reference numerals.

Numerals 1 and 2 denote the oxygen regenerators, 3 and 4 being the nitrogen regenerators. A gel adsorber designated 5 is employed to remove hydrocarbon contaminants, the rectification column 6 separates air into fractions of oxygen and nitrogen of varying purities. The warming-up device consists of a heat exchanger 7 wherein the gas is warmed by means of water; a blower 8; and a further heat exchanger 9 wherein the gas is warmed up by means of steam or electricity, the latter being provided through line 10. A portion of the warm-up gas controllable by the valve 11 can be blown into the rock wool at 12. Under normal operation of the plant, the air to be separated is fed through the conduit 13 controlled by valve 14. The produced oxygen leaves the plant at 15, the nitrogen at 16.

FIGURE 1 shows how the invention is utilized for warming up the separating column 6. By closing the valves 14, 17 and 18, and by opening valves 19, 20 and 21, and by actuating the blower 8, the gas present in the separating column is successively cycled through heat exchanger 7, the blower 8, the heat exchanger 9, conduit 22, and valve 20 back to the separating column 6, and is warmed up during this process.

If, by opening valve 11, a portion of the cycle gas is jetted into the mineral wool at 12, this portion is replaced by opening valves 14 and 18 and allowing air to enter through the regenerators 1 and 3.

FIGURE 2 shows the cycle necessary for thawing the regenerators. By closing valves 19 and 20 and opening valve 18, as well as by closing valves 14, 27 and 28, the air present in regenerators 1 to 4 is conducted successively through the heat exchanger 7, the blower 8, and the heat exchanger 9.

The warm air stream is then fed to the warm ends of regenerators 1 to 4 via conduit 25 through the opened valve 26, whereby the cycle is closed. If desired, it is possible to release a portion of the gas together with the accumulated water by opening the valve 29 at the water trap 30. This gas portion is then replaced by air which is fed through conduit 13 via the valve 14 which of course must be opened.

In FIGURE 3, a cycle is illustrated wherein the adsorber 5 is heated with the aid of the warming-up device and is regenerated thereby. The gas present in the adsorber 5 enters the warm-up device through the opened valves 34 and 19, this warm-up device consisting of the above-described parts 7, 8 and 9, and then this gas enters conduit 22 in the warm state. By closing valves 20 and 21 and opening valve 33, the gas is made to stream only through the adsorber 5 and then through the valves 34 and 19 back again to the warm-up device. By opening valve 35, a portion of the warm-up gas can be released. This portion is to be replaced by freshly fed air via the valves 14 and 18 which correspondingly must be opened. The adsorber 5 is used in the working plant to eliminate water vapour, carbon dioxide or hydrocarbons and is only to be warmed up and regenerated by the process and apparatus of the present invention.

Whereas this invention has been described with particular emphasis on air separation plants, it is generally applicable to any low temperature process wherein gas is cleaned in switchable heat exchangers such as regenerators and reversible exchangers, examples of other processes being hydrogen purification and separation of petroleum fractions.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the low temperature separation of air comprising passing air-to-be-separated through a single air separation plant which is insulated with rock wool insulation, said plant comprising switchable heat exchangers to congeal impurities of said air, and separation apparatus to separate resultant clean air into enriched fractions thereof, and wherein owing to operational problems, it is sporadically necessary to thaw apparatus of said air separation plant, the improvement in the thaw operation comprising the steps of:

(1) employing said clean gas in said single plant as thawing gas for said single plant; and (2) in a substantially closed cycle, repeatedly warming said thawing gas to a higher temperature of about 5–15° C. in indirect heat exchange with water of ambient temperature, passing the warmed gas through a blower, further warming resultant warmed gas to at least about 70° C. in indirect heat exchange with steam and repeatedly recycling resultant warmed thawing gas in direct contact with interior walls of apparatus-to-be-thawed in said single separation plant; and (3) passing a small portion of warmed thawing gas directly into said rock wool insulation surrounding said apparatus-to-be-thawed.

2. A process as defined by claim 1 wherein fresh gas is introduced through said switchable heat exchangers to make up for losses of clean air in said substantially closed cycle.

References Cited

UNITED STATES PATENTS

| | | | |
|---|---|---|---|
| 1,842,263 | 1/1932 | Gobert | 62—12 |
| 2,039,889 | 5/1936 | De Baufre | 62—13 |
| 2,113,680 | 4/1938 | De Baufre | 62—13 |
| 2,116,191 | 5/1938 | De Baufre | 62—13 X |
| 2,337,474 | 12/1943 | Kormemann et al. | 62—18 X |
| 2,503,939 | 4/1950 | De Baufre | 62—18 X |
| 2,793,507 | 5/1957 | Hnilicka | 62—18 X |
| 2,827,775 | 5/1958 | Linde | 62—18 X |
| 2,882,998 | 4/1959 | Grenier | 62—18 |
| 2,460,859 | 2/1949 | Trumpler | 62—14 |
| 2,962,867 | 12/1960 | Seidel | 62—13 XR |
| 3,257,814 | 6/1966 | Carbonell | 62—13 XR |

NORMAN YUDKOFF, *Primary Examiner.*

V. W. PRETKA, *Assistant Examiner.*

U.S. Cl. X.R.

62—18, 30